United States Patent [19]

Cook

[11] Patent Number: 4,772,039
[45] Date of Patent: Sep. 20, 1988

[54] VARIABLE SIZED TRAILER BALL HITCH ASSEMBLY

[76] Inventor: Estle A. Cook, Rte. 1, Box 196, Butler, Mo. 64730

[21] Appl. No.: 100,205

[22] Filed: Sep. 23, 1987

[51] Int. Cl.$^4$ .............................................. B62D 53/00
[52] U.S. Cl. ................................ 280/415 A; 280/504; 280/511; 403/3
[58] Field of Search ............... 280/415 A, 415 R, 504, 280/511, 433; 403/3

[56] References Cited

U.S. PATENT DOCUMENTS

| | | | |
|---|---|---|---|
| 2,911,233 | 11/1959 | Riddle | 280/415 A |
| 4,232,877 | 11/1980 | Milton | 280/415 A |
| 4,456,279 | 6/1984 | Dirck | 280/415 A |

FOREIGN PATENT DOCUMENTS 480880  8/1975  Australia ............................ 280/511

Primary Examiner—John J. Love
Assistant Examiner—Donn McGiehan
Attorney, Agent, or Firm—Hovey, Williams, Timmons & Collins

[57] ABSTRACT

A ball hitch for towing trailers and the like may be assembled in either of two possible configurations so that the resultant assembled ball structure has a selected diameter complemental to the socket of the trailer tongue. The hitch includes an integral body presenting two end portions having a truncated spherical configuration, and a specially adapted bolt may be inserted in either of two directions in a central bore of the body so that the selected end portion of the latter may be located in an outermost disposition for use. Preferably, a smoothly rounded head of the bolt has a radius of curvature equal to the average of the radii of the end portions of the body so that the bolt head and the selected end portion of the body, when the hitch is installed in the vehicle, cooperate to present a rounded structure of a generally spherical configuration.

10 Claims, 1 Drawing Sheet

VARIABLE SIZED TRAILER BALL HITCH ASSEMBLY

BACKGROUND OF THE INVENTION

1. Field of the Invention

This invention broadly relates to a ball trailer hitch assembly for removably coupling a boat, utility or othertype of trailer to a bumper or structural member of a towing vehicle. More particularly, the present invention concerns a trailer hitch which may be assembled to present either of two differently sized spherical portions so that the chosen portion is closely complemental in configuration to the socket of the trailer tongue. The hitch may be disassembled in the field and readily reassembled in a somewhat opposite configuration in order to change the effective size of the hitch ball.

2. Description of the Prior Art

Trailers are available in a variety of types and sizes, ranging from the larger and heavier travel trailers and camping trailers down to smaller hauling or utility trailers. Boat and livestock trailers are also in widespread use and are available in size and weights suitable for the intended loads. For the most part, however, trailers that are hauled by automobiles or smaller trucks are used only on an occasional basis and therefore the towing vehicle and the trailer are typically equipped with interlocking hitch components which may be readily coupled or uncoupled in the field as needed.

Normally, hitch assemblies for smaller trailers resemble a ball and socket joint. The "ball" typically comprises a body having a spherical portion fixed to a stem that extends through an opening in the bumper or other structural member of the towing vehicle, and a nut threaded onto the bottom of the stem beneath the structural member fixes the body to the vehicle. On the other hand, the tongue of the trailer vehicle is provided with a somewhat hemispherical socket that receives the ball, and a locking device prevents unintentional separation of the ball from the socket while the trailer is in use.

Unfortunately, there has been little success to date to standardize throughout the North American continent essential dimensions of ball and socket trailer hitch assemblies. More specifically, many of the somewhat larger trailers are provided with a tongue having a socket adapted to complementally receive a ball having a spherical portion of two inches in diameter. Other trailers, and particularly those of somewhat smaller dimension and weight, have sockets adapted to receive balls of one and seven-eighths inches in diameter.

As a consequence, individuals who make frequent or even infrequent use of different trailers are faced with the problem of providing a trailer hitch ball of a size proper for safely hauling a selected trailer. To this end, many drivers purchase both a two inch hitch ball and a one and seven-eights hitch ball so that either of the balls may be installed on the vehicle once the diameter of the trailer hitch socket has been determined. This practice presents a problem, however, since the hitch ball that is not in use may become lost or misplaced.

SUMMARY OF THE INVENTION

My present invention overcomes the longstanding problem of retaining on hand ball hitches of different sizes by provision of a single hitch assembly that is adaptable to present either of two differently-sized spherical portions in proper upright disposition for use. The hitch assembly may be easily changed over in the field when desired, however, so that the other spherical portion may be placed into a use position in accordance with the tongue socket diamter of the towed vehicle. Thus, a hitch ball of the proper size is always on hand.

In more detail, the hitch assembly of the present invention includes an integral body having a first end portion and a second end portion interconnected by a narrowed section, and each of the end portions presents the configuration of a partial sphere of a diameter different than the other end portion. The assembly also includes a specially adapted bolt that extends through an elongated bore lying along a central axis of the body, and the bolt may be inserted within the bore in either direction so that either of the selected end portions may be placed in an outermost, use position.

In preferred forms of the invention, each of the end portions is truncated and presents an flat end wall perpendicular to the central axis of the body. The bolt has a rounded head presenting an outermost circular edge of a diameter substantially equal to the diameter of the peripheral edge circumscribing the flat end wall of both end portions. As such, the head of the bolt cooperates with the selected end portion of the body to together present a substantially spherically shaped structure once the assembly is installed on a bumper or frame member of the vehicle.

In particularly preferred embodiments of the invention, each of the end portions of the body is formed to present a rounded recess between the outermost, flat end wall and the walls defining the bore extending through the body. The bolt, in turn, presents a curved fillet that extends around the head of the bolt and the stem; the fillet has a configuration complemental to the curved recess so that additional resistance to rotation or loosening of the body is afforded once the hitch assembly is mounted on the body. A flat wear plate in the form of a washer is disposed between the structural mounting member of the vehicle and the flat end wall of the spherical end portion not in use, to thereby protect the end wall and particularly outermost regions of the same from damage.

DETAILED DESCRIPTION OF THE DRAWINGS

Figure 1:
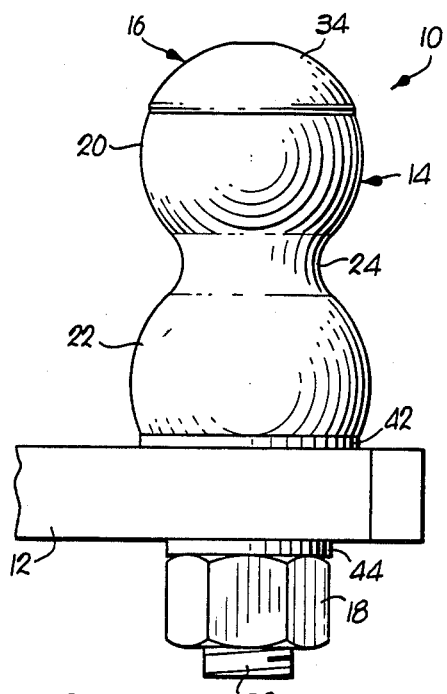
FIG. 1 is a fragmentary, side elevational view of a trailer ball hitch assembly which is constructed in accordance with the principles of the present invention and which is mounted on a structural member of a towing vehicle.

A trailer ball hitch assembly of the present invention is designated by the numeral 10 in FIGS. 1-4 and is mounted on a structural member 12 of a towing vehicle (not shown). in broad terms, the assembly 10 includes a body 14 releasably secured to the structural member 12 by a bolt 16 and a nut 18, the latter of which is threaded onto a lower, complementally threaded end section of bolt 16.

Figure 3:
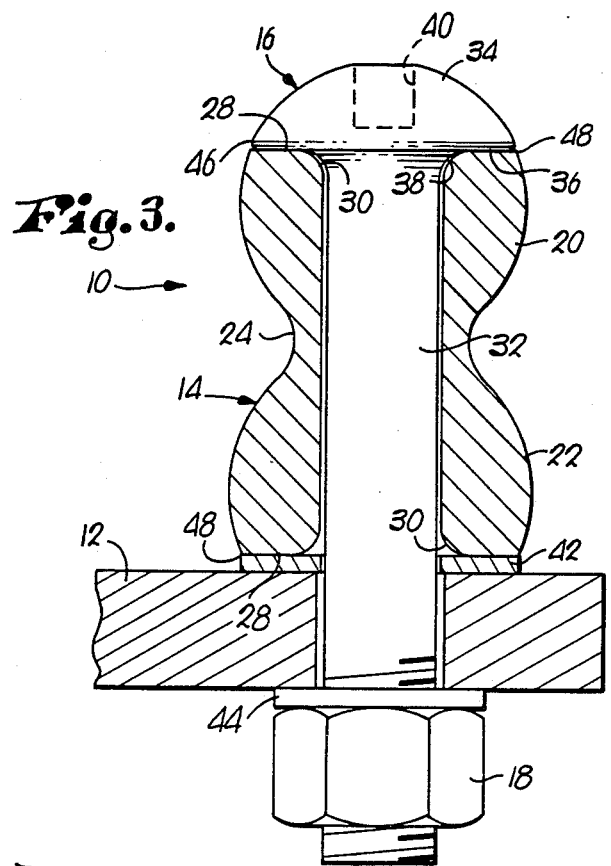
FIG. 3 is an enlarged, fragmentary, side cross-sectional view of the hitch assembly and structural member shown in FIG. 1, depicting an elongated, rounded head bolt which extends through a bore in a body having two generally spherical end portions.
Figure 4:
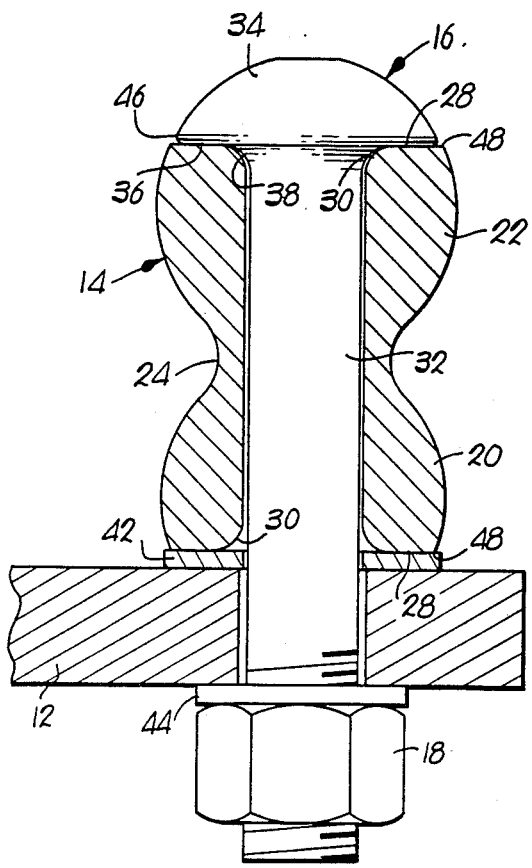
FIG. 4 is a view somewhat similar to FIG. 3 except that the disposition of the body has been reversed in order to present an uppermost spherical ball structure of a diameter somewhat larger than the diameter of the uppermost ball structure shown in FIG. 3.

Referring to FIGS. 1, 3 and 4, the body 14 includes a first end portion 20 and a second end portion 22 which are integrally interconnected by a narrowed region 24. The first end portion 20 and the second end portion 22 each have a configuration of a partial sphere, with the diameter of the second end portion 22 being somewhat larger than the diameter of the first end portion 20. As an example, the second end portion 22 may have a diameter of two inches while the first end portion 20 has a diameter of one and seven-eighths inch.

The body 14 has structure defining an elongated, cylindrical bore 26 that extends along the central, longitudinal axis of body 14 as well as the respective central axes of the first end portion 20, the second end portion 22 and the narrowed region 24. In addition, the first end portion 20 and the second end portion 22 each present truncated end sections having respective flat, outermost end walls 28 that lie in planes perpendicular to the longitudinal axis of bore 26. Smoothly curved walls 30 interconnect the structure defining the bore 26 and the outermost flat walls 28 at each end of the body 14, as shown in FIGS. 3 and 4.

The bolt 16 has an elongated, cylindrical, normally vertical stem 32 that is received in the bore 26 of body 14. Bolt 16 is also provided with a rounded head 34 having an annular, inner flat wall 36 smoothly coupled to stem 32 by curved fillets 38. The fillets 38 hae a shape that closely matches the configuration of the curved walls 30 of body 14, as is illustrated in FIGS. 3 and 4.

The rounded head 34 of bolt 14 has a general configuration of a truncated or partial sphere. Preferably, the diameter of the rounded head 34 is sustantially equal to the diameter of one of the end portions 20, 22. Best results are obtained, however, when the diameter of the rounded head 34 is aproximately equal to the average of the diameters of the end portions 20, 22. Thus, in the example described above, the diameter of head 34 is one and 15/16 inches, a value tht is obtained by averaging the one and seven-eighths inch and two inch diameters of the end portions 20, 22 respectively.

Figure 2:
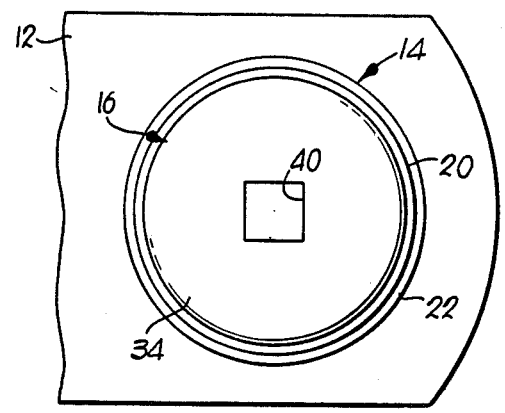
FIG. 2 is an enlarged, fragmentary, plan view of the hitch assembly and structural member shown in FIG. 1.

As shown in FIGS. 2 and 3, the top of the rounded head 34 of bolt 16 has walls defining a cavity 40 that is square in horizontal section. The cavity 40 is preferably of a size (such as threeeigths inch square) to receive the square drive of a ratchet wrench, so that the bolt 16 may be held in a stationary position by the wrench as the nut 18 is tightened to draw the assembly 10 in secure relationship relative to the structural member 12. A flat wear ring or washer 42 is disposed between the lowermost end portion of body 14 and the structural member 12 for preventing damage to the flat wall 28 or of the circular edge of the same, and also a lock washer 44 is received on stem 32 in disposition between the member 12 and nut 18 to substantially prevent loosening of the latter when the assembly 10 is in use.

The stem 32 of bolt 16 is insertable within bore 26 in either direction along the length of the latter. As a consequence, the assembly 10 can be installed on the structural member 12 in such a fashion that a selected one of either of the end portions 20, 22 is placed in an uppermost disposigion for use. In FIGS. 1-3, the smaller, first end portion 20 is located in a use position adjacent head 34 of bolt 16, in outermost relationship relative to the second end portion 22 and structural member 12. By comparison, in FIG. 4 the disposition of the body 14 is reversed relative to the orientation of the body 14 shown in FIGS. 1-3 and the second end portion 22 of the body 14 in FIG. 4 is located in a use position, uppermost and outermost relative to first end portion 20 and structural member 12.

In either of the two orientations of the body 14 illustrated in the drawings, the rounded configuration of the head 34 blends in with the shape of either of the end portions 20, 22 so that a rounded structure of a generally spherical configuration is presented. To this end, an outermost peripheral circular edge 46 of the head 34 has a diameter approximately equal to the diameter of a circular, outermost edge 48 of flat wall 28 on either of the end portions 20, 22. Optionally, the circular edge 46 of head 34 may be slightly rounded and tapered inwardly so that the existence of a sharp, protruding edge is avoided when the slightly larger diameter head 34 is in a position adjacent the slightly smaller diameter first end portion 20 as is depicted in FIG. 3.

Referring again to FIG. 4, it can be appreciated that the widest horizontal section of the sphere cooperatively presented by the head 34 and the second end portion 22 lies in a plane that passes through the second end portion 22. As a result, the second end portion 22 safely retains the socket of the trailer tongue in coupled relationship to the assembly 10 notwithstanding the fact that the diameter of the rounded spherical portion of head 34 is slightly smaller than the diameter of the second end portion 22 and the diameter of the tongue socket. Moreover, the flat walls 28 of the truncated end portions 20, 22 present a relatively wide base to resist the imposition of lateral loadings.

Figure 5:
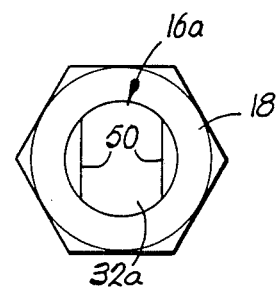
FIG. 5 is a bottom view of an alternate embodiment of the invention showing a lower, flattened portion of the bolt stem.

An alternate embodiment of the invention is shown in FIG. 5, wherein a lower portion of the stem 32a of bolt 16a is flattened to present two parallel, spaced, flat side walls 50. In this manner, a wrench may be placed on the walls 50 during installation or removal of assembly 10 to retain the bolt 16a in a stationary position as a second wrench is placed on nut 18 to turn the latter. In this embodiment, a wrench receiving cavity such as cavity 40 in FIGS. 1-4 need not be provided.

While the foregoing represents a detailed description of currently preferred embodiments of my invention, those skilled in the art can recognize that various additions or modifications may be effected without departing from my contribution to the art. It is to be understood, therefore, that the invention shall be deemed limited only by a fair scope of the claims which follow, along with their mechanical equivalents.

I claim:
1. A hitch assembly comprising:
   a body including a first end portion having a general configuration of a partial sphere with a certain diameter and a second end portion having a general configuration of a partial sphere of a diameter different than said certain diameter,
   said body including structure defining an elongated bore extending along a central axis of said body through said first end portion and said second end portion, each of said end portions presenting a truncated, outermost end section; and bolt means having a rounded head and an elongated stem extending through said bore for coupling said body to a structural member of a vehicle, said stem being insertable in said bore in a selected one of either of two oppositely oriented directions along the length of said bore for enabling a selected, corresponding end portion to be disposed in outermost relation relative to the other of said end portions and to said frame member, said head of said bolt means being of a configuration generally complemental to the configurations of both of said end portions such that said head of said bolt cooperates with the selected end portion to present a generally spherically shaped ball structure for towing a vehicle.

2. The invention as set forth in claim 1, wherein said head of said bolt presents an outermost circular edge, and wherein said truncated end sections of each of said end portions includes a peripheral edge circumscribing the respective end section, and wherein said outermost edge of said bolt head has a diameter substantially equal to the average diameter of said peripheral circular edges of said truncated end sections.

3. The invention as set forth in claim 1, wherein said head of said bolt has walls defining a polygonal cavity for receiving a tool to facilitate installation or removal of said hitch assembly.

4. The invention as set forth in claim 1, wherein said bolt includes a fillet extending between said head and said stem, and wherein said each of said end portions includes structure presenting a recess adjacent said bore for complemental reception of said fillet.

5. The invention as set forth in claim 1 and including a wear plate received on said bolt adjacent the end section of said other end portion.

6. the invention as set forth in claim 1, wherein said stem has a portion remote from said head which is provided with a pair of flat walls for reception by a wrench to facilitate installation or removal of said hitch assembly.

7. A hitch assembly comprising:
an elongated body having a first end portion and a second end portion remote from said first end portion, said first end portion having a general configuration of a partial sphere with a certain diameter, said second end portion having a general configuration of a partial sphere of a diameter different than said certain diameter, said first end portion and said second end portion each having structure defining a bore section; and means detachably received in at least one of said bore sections of said first end portion and said second end portions for connecting said assembly to a structural member of a vehicle, said means extending outwardly from said body in a selected one of either of two possible, oppositely oriented directions which are both generally parallel to the longitudinal axis of said body for enabling a selected one of said end portions to be disposed in outermost relation relative to the other of said end portions and said structural member.

8. The invention as set forth in claim 7, wherein said bore sections are in contiguous, communicative relationship relative to each other and extend along the longitudinal axis of said body.

9. The invention as set forth in claim 7, wherein each of said first end portion and said second end portion presents truncated end sections.

10. The invention as set forth in claim 9, wherein each of said truncated end sections has respective flat, outermost end walls that lie in corresponding planes perpendicular to the longitudinal axis of said body.

* * * * *